UNITED STATES PATENT OFFICE.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

PROCESS OF MAKING A FERTILIZER FROM TANK-WASTES.

SPECIFICATION forming part of Letters Patent No. 342,238, dated May 18, 1886.

Application filed July 6, 1885. Serial No. 170,808. (No specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in an Art or Process of Utilizing Waste Liquids of Meat and Fat Rendering Establishments, which are fully set forth in the following specification.

The utilization of waste tank-liquids, technically termed "tank-waters," produced usually under high temperature and pressure in the process of rendering lard, tallow, and similar substances, has been heretofore ineffective in securing the best results, because the fertilizer produced has usually been sticky and difficult to handle, and the by-products contained in the liquids have been allowed to escape, or have been of such a character as to be almost valueless. This unprofitable and partial utilization of tank-liquids has been caused, mainly, by a failure to understand the changes produced in their organic constituents by the high temperature and pressure to which they have been subjected during the process of rendering, and as a consequence heat has been applied only far enough to dry without effecting decomposition, thus failing to destroy the viscidity and deliquescence of the article produced, or else the heat has been rapidly carried to such destructive limits that much of the nitrogen has been lost and the residual products rendered of little value.

My invention as described in this application relates to the process of making a fertilizer, more fully described in my separate application, No. 173,541, for a patent "for improvement in antiseptic and insecticide fertilizers," and certain by-products resulting from said operation.

It consists in a new process for treating these liquids by heat within such prescribed limits as will gradually decompose and liquefy their original albuminoids into less complicated molecular structures, separating and collecting the several resultants in the most desirable and profitable manner without any appreciable loss of nitrogen. This I have discovered can be best attained within the limits of 380° and 500° Fahrenheit, when applied for a period of three to four hours, regulated by the quantity of material to be treated at any one time, but subsequent to the liquids having been first treated to the extent of 212° Fahrenheit, in doing which any free ammonia can be recovered by passing the steam first and last generated through a refrigerating and acid condenser. When these liquids have been th evaporated to about twenty to twenty-five per cent. of moisture, if dried at 300° or 350° Fahrenheit, a brown solid material is produced, in which the deliquesence and viscidity is only temporarily masked, so that when it is exposed to ordinary atmospheric influences these objectionable conditions reappear much the same as before drying. This I remedy by heating the material, preferably, in an air-tight vessel, so that when the temperature reaches about 380° Fahrenheit it begins to decompose, and by increasing the heat a certain proportion of pyrrol and carbolic acid is produced. The thickening and stiffening mass now begins to liquefy, and when the heat amounts to 450° Fahrenheit and the layer of material is not more than four inches thick it assumes the appearance and condition of heated asphalt. The best results are secured between 460° and 480° Fahrenheit, and should not exceed 500° Fahrenheit, when the larger proportion of its more volatile and deliquescent products of decomposition will be driven off and may be collected in suitable apparatus. This material which I have described as resembling asphalt has been produced by the gradual decomposition of the original albuminoids, thus chemically changing their organic constituents into less complicated molecular structures—such as amines, salts of ammonia, nitrogenous carbon, and phenols—and by new combinations of a part of its carbon, hydrogen, and oxygen, forming carbolic acid, which is intimately mixed with the general mass, thus constituting a homogeneous compound of rich nitrogenous substances suitable for fertilizing purposes.

The compound, when hot, flows readily from the vessel in which it has been heated; but when cold it is sufficiently brittle to be easily powdered, does not stick together after exposure to the atmosphere, and the phenol compounds it contains tend to destroy insects, which, always being in the presence of ammonia compounds, cause no injury to plants, but in their decomposition and solution feed the crops to which they are applied.

During the operation which I have described, if it be conducted for about four hours at about 460° Fahrenheit with a layer of material four inches thick containing twenty to twenty-five per cent. of moisture, the original weight of its solids is decreased from twenty to forty per cent.; but, as the material develops a property which will absorb and retain ammonia, its nitrogen ratio is largely increased, thus producing a concentrated insecticide fertilizer free from deliquesence and viscidity, and much richer in per cent. of nitrogen than were the solids previous to decomposition, any nitrogen released being collected in the several by-products obtained by this process. To collect these different by-products it is necessary in this operation that air-tight vessels be used, which may be stationary or revolving, provided with suitable openings for the introduction of the material and the evacuation of the fertilizer when finished, connected also with such subsidiary apparatus as may be best adapted for the collection and utilization of the various by-products obtained. Substantially the same results may be obtained by varying the heat, time, and thickness of material; but other than the equivalent of those specified will result in a loss or failure to accomplish these results.

What I claim is—

The above-described process of producing a non-deliquescent non-viscid carbolized fertilizer from the tank-wastes of rendering and slaughter houses, which consists in first evaporating said wastes to about twenty per cent. of moisture, and then distilling the same at a temperature of about 460° Fahrenheit, whereby on cooling a non-viscid and non-deliquescent product is obtained.

JOSEPH VAN RUYMBEKE.

Witnesses:
 WM. ZIMMERMAN,
 WM. FK. JOBBINS.